US012802093B2

(12) United States Patent
Bernazzani

(10) Patent No.: US 12,802,093 B2
(45) Date of Patent: Nov. 17, 2026

(54) SYSTEM FOR REAL-TIME MARKETING AUTOMATION USING ADAPTIVE AND EMERGING AI MODELS

(71) Applicant: Christopher Bernazzani, Saint James, NY (US)

(72) Inventor: Christopher Bernazzani, Saint James, NY (US)

( * ) Notice: Subject to any disclaimer, the term of this patent is extended or adjusted under 35 U.S.C. 154(b) by 0 days.

(21) Appl. No.: 19/371,813

(22) Filed: Oct. 28, 2025

(65) Prior Publication Data

US 2026/0212379 A1 Jul. 23, 2026

Related U.S. Application Data

(60) Provisional application No. 63/716,178, filed on Nov. 4, 2024, provisional application No. 63/715,350, filed (Continued)

(51) Int. Cl.

| | |
|---|---|
| ***G06Q 30/0203*** | (2023.01) |
| ***G06N 3/02*** | (2006.01) |
| ***G06N 3/08*** | (2023.01) |
| ***G06N 20/00*** | (2019.01) |
| ***G06Q 30/0201*** | (2023.01) |

(52) U.S. Cl.

CPC ........... *G06Q 30/0203* (2013.01); *G06N 3/02* (2013.01); *G06N 3/08* (2013.01); *G06N 20/00* (2019.01); *G06Q 30/0201* (2013.01)

(58) Field of Classification Search

CPC ........... G06Q 30/0203; G06Q 30/0201; G06N 20/00; G06N 3/02; G06N 3/08

See application file for complete search history.

(56) References Cited

U.S. PATENT DOCUMENTS

| | | | | |
|---|---|---|---|---|
| 2015/0186925 | A1* | 7/2015 | Chittilappilly | G06Q 30/0242 705/14.41 |
| 2024/0354641 | A1* | 10/2024 | Miller | G06N 3/045 |
| 2026/0037863 | A1* | 2/2026 | Angeles | G06N 20/00 |

OTHER PUBLICATIONS

Reymondet, et al. Considerations for Model Curation in Model-Centric Systems Engineering 2016 Annual IEEE Systems Conference (SysCon) 1 (2016) (Year: 2016).*

* cited by examiner

*Primary Examiner* — Charles Guiliano

(74) *Attorney, Agent, or Firm* — Shore IP Group, PLLC; Sean R. Wilsusen

(57) ABSTRACT

A system for real-time marketing automation employs adaptive artificial-intelligence (AI) models to process user behavior data from a plurality of sources such as customer-relationship-management systems, social-media platforms, websites, and mobile applications. A processor executes instructions stored in memory to perform marketing-automation tasks including predicting user-engagement trends, generating personalized content, and monitoring compliance with data-privacy requirements. Output data produced by one AI model is used as input to another to adjust marketing parameters in real time. Engagement data received across multiple communication channels is fed back to the AI models to update stored user profiles and campaign parameters. An integration interface registers metadata describing additional AI models and synchronizes the additional models with existing data pipelines without altering the underlying system architecture, enabling adaptive, compliant, and scalable marketing operations.

20 Claims, 7 Drawing Sheets

Related U.S. Application Data on Nov. 1, 2024, provisional application No. 63/714,703, filed on Oct. 31, 2024, provisional application No. 63/713,891, filed on Oct. 30, 2024, provisional application No. 63/713,461, filed on Oct. 29, 2024.

SYSTEM FOR REAL-TIME MARKETING AUTOMATION USING ADAPTIVE AND EMERGING AI MODELS

CROSS-REFERENCE TO RELATED APPLICATION

The present non-provisional patent application claims priority to U.S. Provisional Ser. No. 63/713,461, filed on Oct. 29, 2024, and U.S. Provisional Ser. No. 63/713,891, filed on Oct. 30, 2024, and U.S. Provisional Ser. No. 63/714,703, filed on Oct. 31, 2024, and U.S. Provisional Ser. No. 63/715,350, filed on Nov. 1, 2024, and U.S. Provisional Ser. No. 63/716,178, filed on Nov. 4, 2024, the entire contents of each of which are incorporated by reference herein.

FIELD

The present disclosure relates to the field of artificial intelligence and marketing automation systems, and more particularly to adaptive, multi-model AI frameworks that enable real-time personalization, predictive analytics, and regulatory-compliant marketing across multiple digital and emerging communication channels.

BACKGROUND

In today's digital landscape, marketing automation systems are essential for managing customer engagement across platforms such as email, social media, and mobile applications. However, traditional systems often depend on static algorithms and rigid workflows that cannot easily adapt to changing user behavior, emerging communication technologies, or evolving data privacy regulations.

This creates a need for a dynamic AI-driven marketing framework capable of real-time adaptation, seamless integration of new technologies, and automated compliance with regulatory standards.

SUMMARY

The present disclosure relates to the field of artificial intelligence and marketing automation systems, and more particularly to adaptive, multi-model AI frameworks that enable real-time personalization, predictive analytics, and regulatory-compliant marketing across multiple digital and emerging communication channels.

Provided in accordance with aspects of the present disclosure is a system for real-time marketing automation using adaptive AI models. The system includes a processor and a memory including instructions stored thereon, which, when executed by the processor, cause the system to: access user behavior data from a plurality of sources including at least two of: customer relationship management systems, social media platforms, websites, or mobile applications; perform one or more marketing automation tasks, using a plurality of artificial intelligence models, the one or more marketing automation tasks include as output data one or more of:

predicting user engagement trends, generating personalized content, or monitoring compliance with data privacy requirements; coordinate operation of the plurality of artificial intelligence models such that the output data from one of the plurality of artificial intelligence models is used as input to another one of the plurality of artificial intelligence models to adjust one or more marketing parameters in real time; update a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and integrate additional artificial intelligence models, responsive to changes in the plurality of sources or the one or more marketing parameters, through an interface configured to register metadata describing each additional artificial intelligence model and to synchronize the additional artificial intelligence models with existing data pipelines without altering the underlying system architecture.

In an aspect of the disclosure, the plurality of artificial intelligence models may include a predictive analytics model configured to forecast user engagement likelihood based on temporal activity patterns and interaction frequency metrics.

In an aspect of the disclosure, the plurality of artificial intelligence models may include a content personalization model configured to select or generate marketing content using natural language generation or recommendation algorithms.

In an aspect of the disclosure, the plurality of artificial intelligence models may include a compliance monitoring model configured to verify user consent status and data-handling operations in accordance with privacy regulations including the General Data Protection Regulation (GDPR) and the California Consumer Privacy Act (CCPA).

In an aspect of the disclosure, coordinating operation of the plurality of artificial intelligence models may include generating a shared context dataset that aligns outputs of the predictive analytics model, the content personalization model, and the compliance monitoring model.

In an aspect of the disclosure, the defined feedback process may include updating one or more parameters of at least one of the plurality of artificial intelligence models based on A/B testing results, conversion metrics, or detected engagement anomalies.

In an aspect of the disclosure, the interface for integrating the additional artificial intelligence models may include an application programming interface configured to register metadata of each additional artificial intelligence model and synchronize input and output formats of each additional artificial intelligence model.

In an aspect of the disclosure, the instructions when executed by the processor, may further cause the system to dynamically reallocate computing resources among the plurality of artificial intelligence models based on detected processing loads or campaign performance thresholds.

In an aspect of the disclosure, the instructions when executed by the processor, may further cause the system to store version control data for each of the plurality of artificial intelligence models, and the processor reverts to a prior version of one of the plurality of artificial intelligence models upon detecting degraded performance.

In an aspect of the disclosure, the instructions when executed by the processor, may further cause the system to generate explainability data describing decision paths or parameter weightings associated with the predictive analytics model to support auditability and transparency.

Provided in accordance with aspects of the present disclosure is a computer-implemented method for real-time marketing automation using adaptive artificial intelligence (AI) models, includes: accessing user behavior data from a plurality of sources including at least two of: customer relationship management systems, social media platforms, websites, or mobile applications; performing one or more marketing automation tasks, using a plurality of artificial intelligence models, the one or more marketing automation tasks include as output data one or more of: predicting user engagement trends, generating personalized content, or monitoring compliance with data privacy requirements; coordinating operation of the plurality of artificial intelligence models such that the output data from one of the plurality of artificial intelligence models is used as input to another one of the plurality of artificial intelligence models to adjust one or more marketing parameters in real time; updating a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and integrating additional artificial intelligence models, responsive to changes in the plurality of sources or the one or more marketing parameters, through an interface configured to register metadata describing each additional artificial intelligence model and to synchronize the additional artificial intelligence models with existing data pipelines without altering the underlying system architecture.

In an aspect of the disclosure, the method may further include forecasting user engagement likelihood based on temporal activity patterns and interaction frequency metrics using a predictive analytics model of the plurality of artificial intelligence models.

In an aspect of the disclosure, the method may further include generating marketing content using a content personalization model of the plurality of artificial intelligence models based on user behavior data.

In an aspect of the disclosure, the method may further include verifying user consent status and data-handling operations using a compliance monitoring model of the plurality of artificial intelligence models in accordance with privacy regulations.

In an aspect of the disclosure, the method may further include generating a shared context dataset to align outputs of a predictive analytics model, a content personalization model, and a compliance monitoring model of the plurality of artificial intelligence models.

In an aspect of the disclosure, the method may further include updating one or more parameters of at least one of the plurality of artificial intelligence models based on A/B testing results, conversion metrics, or detected engagement anomalies.

In an aspect of the disclosure, the method may further include registering an additional artificial intelligence model through the interface by providing model metadata and synchronizing input and output formats of the additional artificial intelligence model with the plurality of artificial intelligence models.

In an aspect of the disclosure, the method may further include reallocating computing resources among the plurality of artificial intelligence models based on detected processing loads or campaign performance thresholds.

In an aspect of the disclosure, the method may further include generating explainability data describing decision paths or parameter weightings of at least one of the plurality of artificial intelligence models to support auditability and transparency.

Provided in accordance with aspects of the present disclosure is a non-transitory computer readable medium, storing instructions for executing a computer-implemented method for real-time marketing automation using adaptive artificial intelligence (AI) models, including:

- accessing user behavior data from a plurality of sources including at least two of: customer relationship management systems, social media platforms, websites, or mobile applications; performing one or more marketing automation tasks, using a plurality of artificial intelligence models, the one or more marketing automation tasks include as output data one or more of: predicting user engagement trends, generating personalized content, or monitoring compliance with data privacy requirements; coordinating operation of the plurality of artificial intelligence models such that the output data from one of the plurality of artificial intelligence models is used as input to another one of the plurality of artificial intelligence models to adjust one or more marketing parameters in real time; updating a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and integrating additional artificial intelligence models, responsive to changes in the plurality of sources or the one or more marketing parameters, through an interface configured to register metadata describing each additional artificial intelligence model and to synchronize the additional artificial intelligence models with existing data pipelines without altering the underlying system architecture.

BRIEF DESCRIPTION OF THE DRAWINGS

Various aspects and features of the present disclosure are described hereinbelow with reference to the drawings wherein.

DETAILED DESCRIPTION

Figure 1:
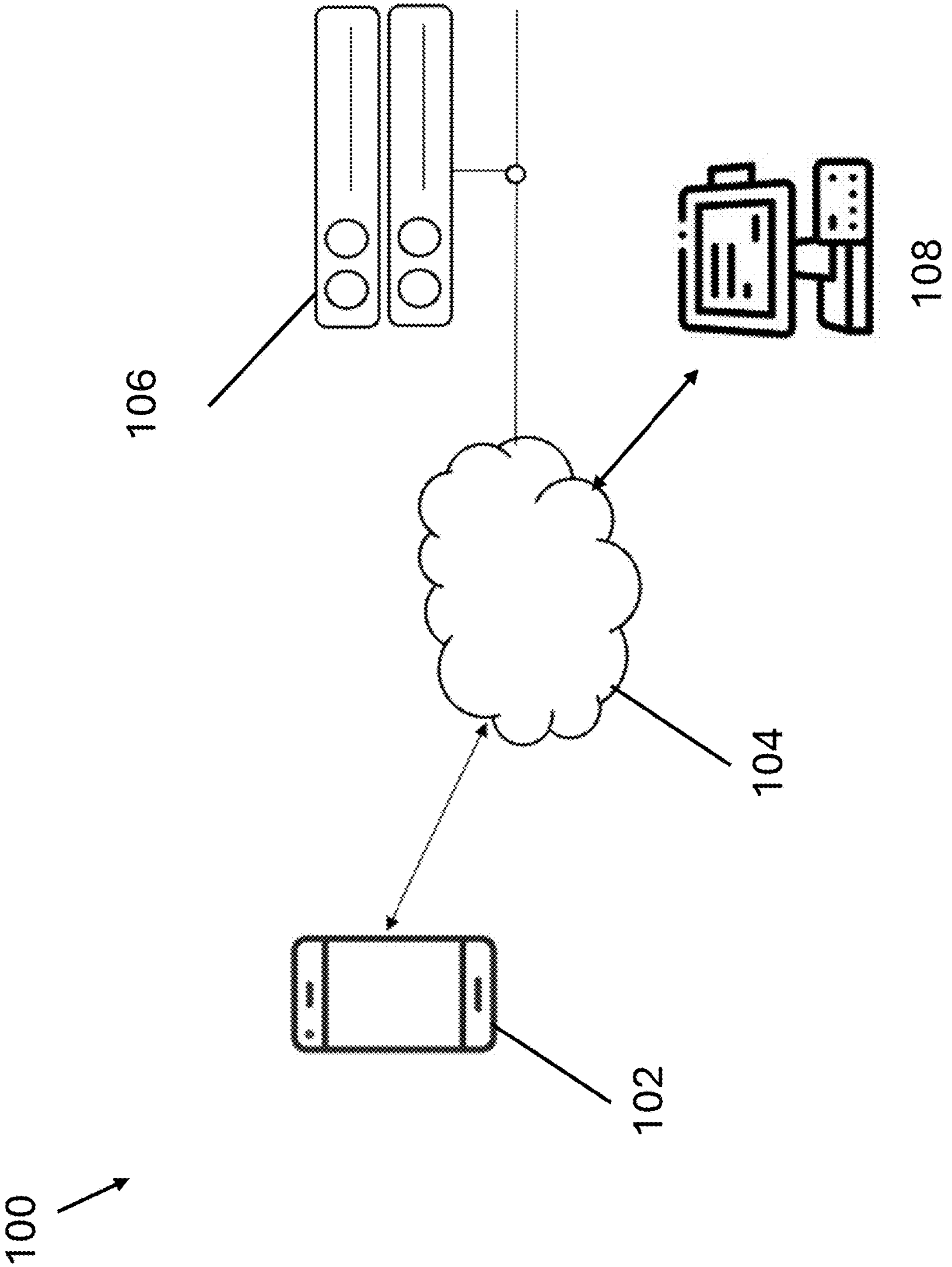
FIG. 1 is a block diagram of an architecture for a system for real-time marketing automation using adaptive artificial intelligence, according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The present disclosure relates to the field of artificial intelligence and marketing automation systems, and more particularly to adaptive, multi-model AI frameworks that enable real-time personalization, predictive analytics, and regulatory-compliant marketing across multiple digital and emerging communication channels.

Referring particularly to FIG. 1, a system 100 for real-time marketing automation using adaptive artificial intelligence (AI) models generally includes a mobile device 102 (e.g., a first user device), a home computer, a server 106, a laptop, and/or a tablet in network 104 communication with a second user device 108. The mobile device 102, a home computer, a server 106, a laptop, and/or a tablet may be a general-purpose computer 200 (e.g., a processor), of FIG. 2, configured for network 104 communications. Portions of system 100 may operate as an application for real-time marketing automation using adaptive artificial intelligence (AI) models installed on one user device.

Modern marketing automation systems struggle to keep pace with rapidly evolving user behaviors, emerging engagement channels, and shifting data privacy regulations. Traditional solutions rely on static algorithms and siloed workflows that lack the adaptability to integrate new AI models, dynamically personalize content, or maintain real-time compliance across multiple platforms. This results in the technical problem of inefficient targeting, inconsistent user experiences, and/or delayed decision-making that hinder marketing performance and regulatory adherence.

The system 100 integrates additional artificial intelligence models through a modular user interface 302 (FIG. 3A) that enables new models to be registered and synchronized without structural modification to the existing architecture. The user interface 302 receives metadata describing each model's input schema, output schema, and functional type, and stores this information in a model registry accessible to the orchestration engine. When a new model is introduced, the system 100 uses the registered metadata to automatically establish data routing and execution dependencies with existing models. This enables the system 100 to dynamically expand or update its set of AI models in response to changes in data sources or marketing parameters while maintaining compatibility with existing data pipelines and processing components. The system may maintain data integrity through defined modification protocols between processing stages.

The system 100 leverages adaptive model systems. For example, the system 100 provides a suite of AI models designed to address key marketing functions, including predictive analytics, personalized content, and privacy compliance. Each model functions adaptively, enabling the system to make dynamic adjustments based on user interactions and external inputs. Each processing stage can operate in deterministic or AI-enhanced mode based on configuration parameters. Processing stages preserve prior transformation states while applying additive modifications within their designated functional domains. Transformed marketing content is output to maintain compatibility with multiple distribution channels. This enables cross-model collaboration by enabling integrated operation among AI models, where, for instance, compliance outputs inform content personalization efforts. This interaction ensures that all functions operate in a synchronized and compliant manner, supporting cohesive, context-aware user engagement. The system 100 enables privacy and compliance AI model by managing data privacy and user consent dynamically, ensuring real-time compliance with GDPR, CCPA, and other relevant regulations. This model supports adaptive privacy through real-time monitoring and API-based synchronization, allowing the system to maintain regulatory alignment across channels. The system 100 provides a layered personalization framework that incorporates real-time emotional and psychological insights into user engagement strategies, adjusting content and interaction intensity based on behavioral data. This framework personalizes user experiences by dynamically aligning messaging with motivational states and preferences.

Figure 2:
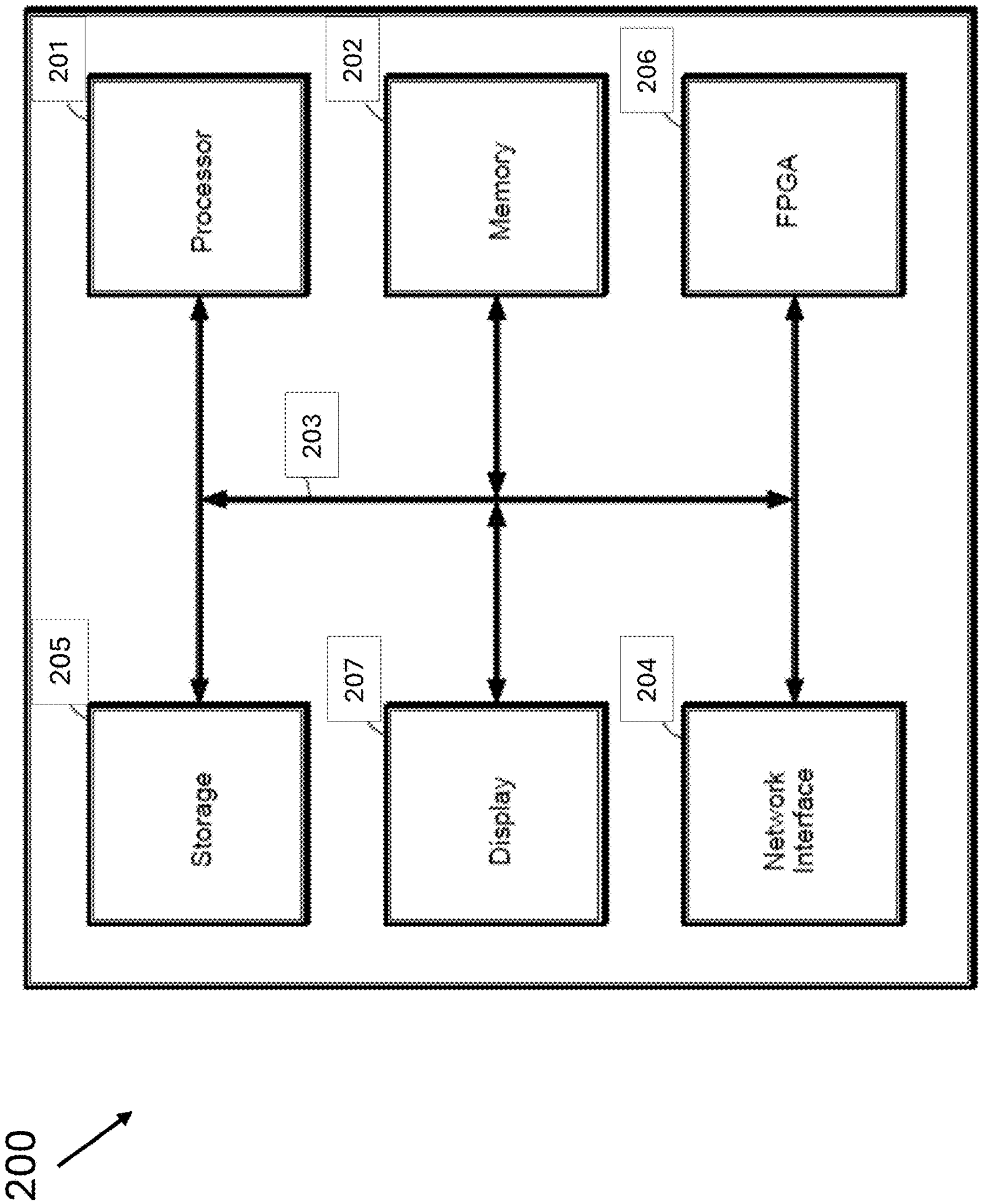
FIG. 2 is a block diagram of the system of FIG. 1 according to aspects of the present disclosure.

Referring to FIG. 2, the general-purpose computer 200 employable by system 100 is described. The computer 200 may include a processor 201 connected to a computer-readable storage medium or a memory 202 which may be a volatile type memory, e.g., RAM, or a non-volatile type memory, e.g., flash media, disk media, etc. The processor 201 may be another type of processor such as, without limitation, a digital signal processor, a microprocessor, an ASIC, a graphics processing unit (GPU), field-programmable gate array (FPGA), or a central processing unit (CPU). General-purpose computer 200, for example may include a mobile device such as a cell phone or a tablet.

In some aspects of the disclosure, the memory 202 can be random access memory, read-only memory, magnetic disk memory, solid state memory, optical disc memory, and/or another type of memory. The memory 202 can communicate with the processor 201 through communication buses 203 of a circuit board and/or through communication cables such as serial ATA cables or other types of cables. The memory 202 includes computer-readable instructions that are executable by the processor 201 to operate the computer 200 to execute the various functions described herein. The computer 200 may include a network interface 204 to communicate (e.g., through a wired or wireless connection) with other computers or a server. A storage device 205 may be used for storing data. The computer 200 may include one or more FPGAs 206. The FPGAs 206 may be used for executing various functions described herein. A display 207 may be employed to display data processed by the computer 200.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

Figure 3:
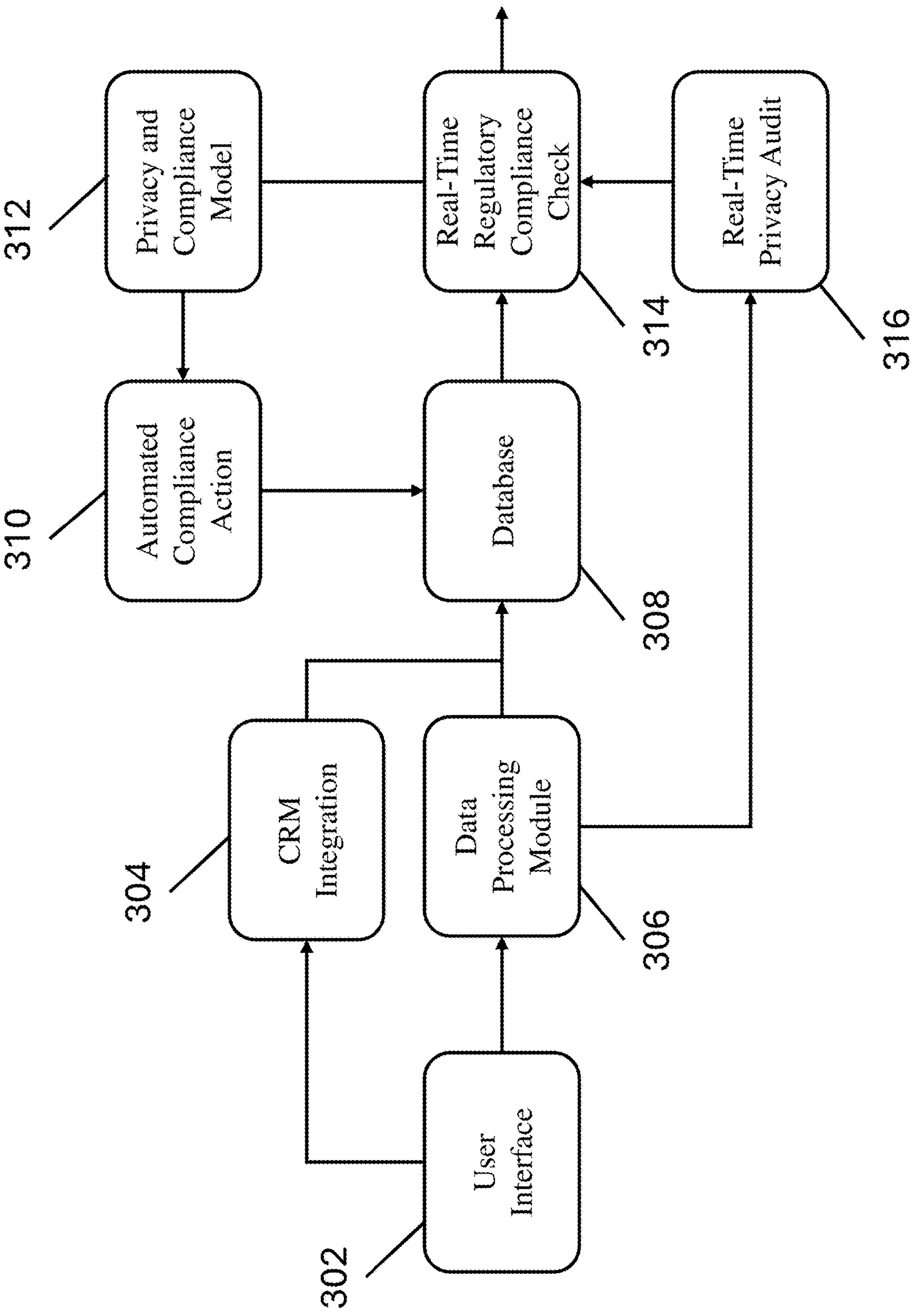
FIG. 3 is a block diagram illustrating a user interface and compliance model of the system of FIG. 1, according to aspects of the present disclosure.
Figure 4:
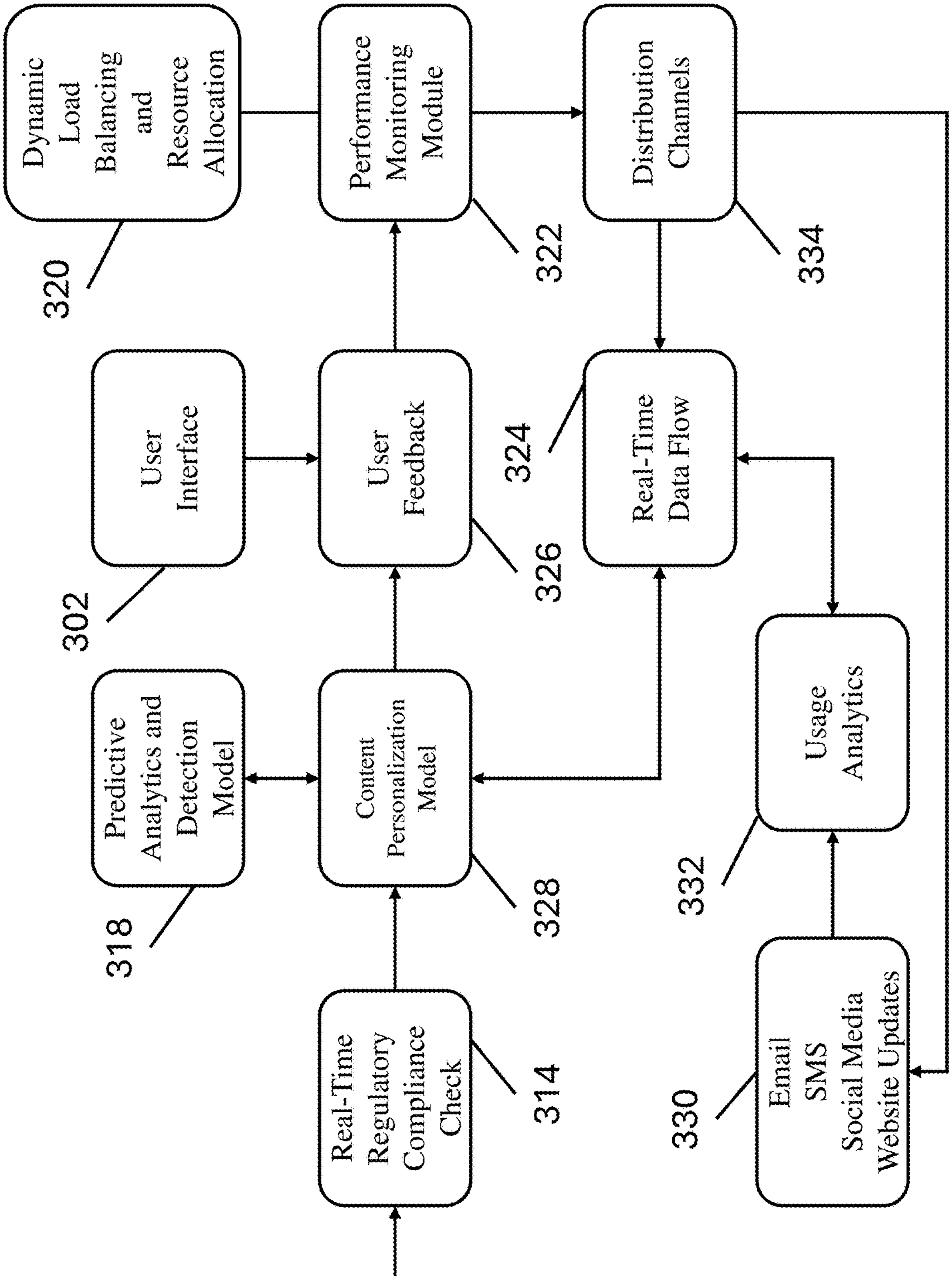
FIG. 4 is a block diagram illustrating the user interface and the predictive analytics and detection model of the system of FIG. 1, according to aspects of the present disclosure.
Figure 5:
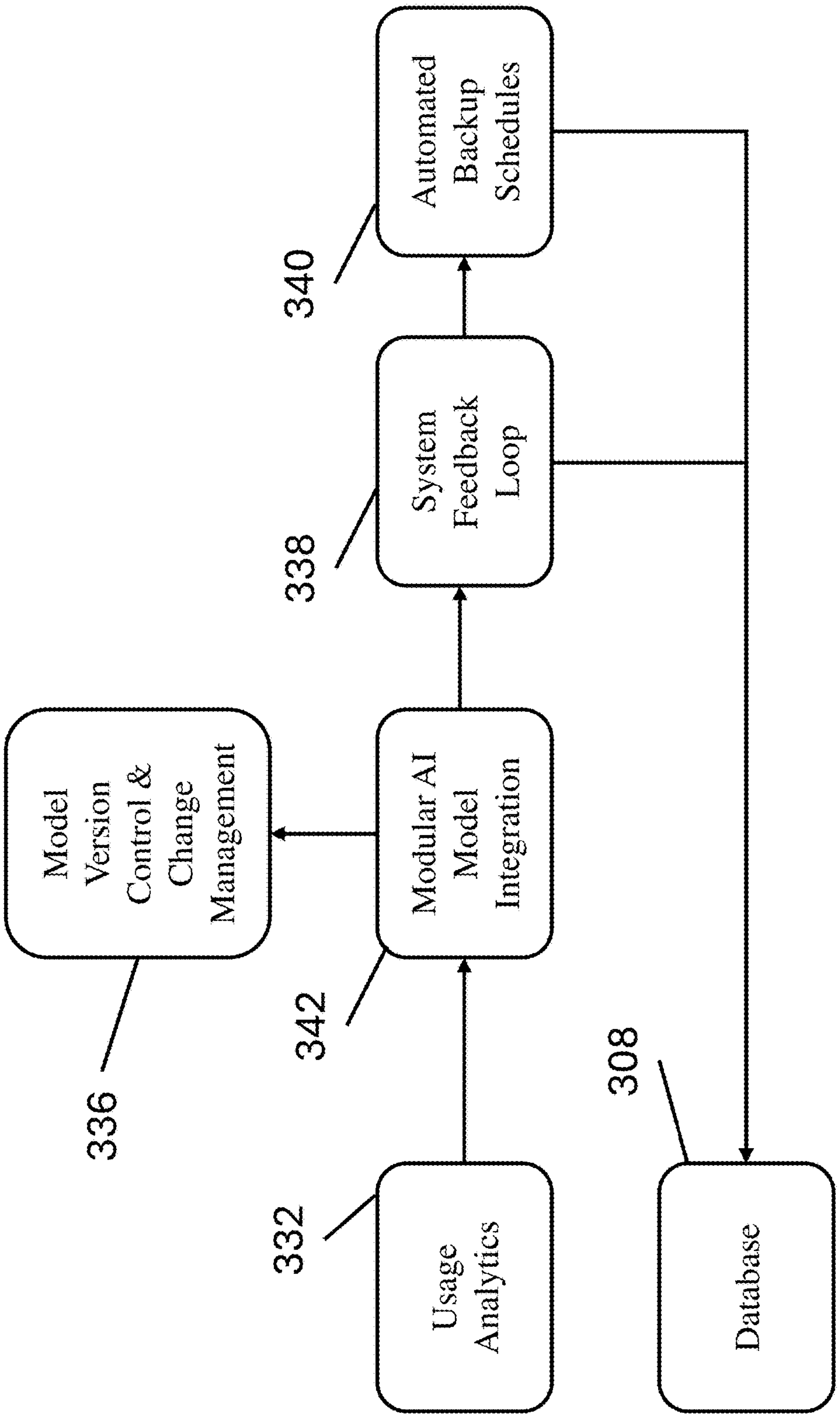
FIG. 5 is a block diagram illustrating the usage analytics of the system of FIG. 1, according to aspects of the present disclosure.

FIGS. 3 to 5 illustrate a system 100 for real-time marketing automation using adaptive artificial intelligence (AI) models. The system 100 includes hardware and software components that together enable the coordinated operation of multiple AI subsystems for prediction, personalization, and compliance verification. Each element shown in FIGS. 3 to 5 is communicatively coupled through a defined data-flow architecture that supports bidirectional information exchange and continuous feedback. The system operates on one or more processors executing machine-readable instructions stored in one or more memory devices, which may include cloud-based or local storage resources.

The user interface 302 is configured to provide a structured human-machine interaction layer that enables configuration, monitoring, and control of the system 100. In aspects, the user interface 302 may be implemented as a web-based control console hosted on a secure server accessible via a standard browser or dedicated client application. The user interface 302 may include interactive panels that display system metrics, predictive outputs, compliance alerts, and content generation results in real time. The user interface 302 is communicatively coupled to backend modules via an application programming interface (API) layer, allowing user inputs to be transmitted as structured data objects to the data processing module 306, predictive analytics and detection model 318, and content personalization model 328.

The predictive analytics and detection model 318 is configured to analyzes user behavior trends in real time, allowing the system to forecast engagement patterns and make proactive adjustments to marketing strategies. This model supports data-driven decision-making, enhancing engagement by predicting and responding to user needs.

The content personalization model 328 is configured to customize content delivery across channels, adapting messaging to align with individual user preferences and real-time engagement data. This model ensures high content relevance, maintaining user interest by dynamically adjusting content based on user interaction signals.

The system 100 further includes a dynamic emotional and psychological adaptation model which leverages real-time emotional and psychological insights to tailor engagement, utilizing sentiment analysis and emotional cues to enhance personalization. This model adapts content to users' motivational states, enriching user relevance and engagement across interaction stages.

In certain implementations, the user interface 302 includes graphical components such as time-series charts for engagement prediction, model selection dropdowns, and editable templates for campaign content. Each modification made through the user interface 302 generates a transaction log entry stored in the database 308 to ensure reproducibility and auditability of system operations.

The user interface 302 is configured to facilitate monitoring of compliance status in coordination with the privacy and compliance model 312 and the real-time regulatory compliance check 314. When an operator selects a campaign for execution, the interface automatically queries the compliance models for verification results before permitting activation. Visual indicators, such as color-coded status icons or dialog notifications, inform the operator whether each data record satisfies consent requirements. The user interface 302 further provides options to adjust consent-handling parameters, such as anonymization or exclusion rules, which are transmitted to the automated compliance action 310 for enforcement. These real-time controls allow the operator to maintain full oversight of compliance and personalization workflows without requiring direct interaction with backend code or model internals.

In an illustrative example of use, a campaign manager accesses the user interface 302 through a browser connection secured by encrypted authentication credentials. Upon login, the dashboard displays active marketing campaigns, historical performance statistics from the usage analytics 332, and current load distribution data reported by the performance monitoring module 322. The operator selects a new campaign configuration option and specifies a target group of users identified through the CRM integration 304. Through an interactive dialog, the operator sets parameters including engagement timing, preferred distribution channels under Email, SMS, social media, Website Updates 330, and message length limits. The operator also enables an adaptive learning mode, which instructs the predictive analytics and detection model 318 to adjust weighting factors based on the first twenty-four hours of engagement data. After entering this configuration, the operator initiates a compliance pre-check by pressing a verification control on the user interface 302. The privacy and compliance model 312 responds with a summary report confirming that ninety-eight percent of records meet current consent requirements, and the user interface 302 highlights the remaining two percent for review. The operator uses a selectable option to anonymize those records automatically, triggering a command to the automated compliance action 310. The user interface 302 then displays a confirmation message that all records now comply, and the operator proceeds to deploy the campaign.

In certain embodiments, the plurality of artificial intelligence models used within the system 100 (e.g., the predictive analytics and detection model 318, the content personalization model 328, and/or the privacy and compliance model 312) include supervised, unsupervised, and reinforcement learning architectures trained using historical interaction data, transaction logs, and contextual metadata derived from the database 308. The predictive analytics and detection model 318 may include, for example, a transformer-based neural network, a gradient-boosted decision tree ensemble, or a recurrent neural network configured for temporal sequence prediction. During training, the predictive analytics and detection model 318 receives as input feature vectors representing user behavior attributes such as interaction timestamps, session durations, and device identifiers. The output label for each training instance corresponds to an observed engagement event, such as a click, purchase, or message response. The model parameters are optimized using backpropagation or gradient-boosting procedures to minimize a defined loss function, such as cross-entropy loss for classification or mean-squared error for regression. Once trained, the predictive analytics and detection model 318 processes incoming behavioral data in real time and generates a numeric probability score representing a predicted likelihood of user engagement within a specified time window.

The content personalization model 328 may employ a neural language model, a collaborative-filtering recommender network, or a hybrid architecture combining embeddings from user activity data with semantic representations of content. In one example, a transformer model is trained using historical message text, images, and engagement outcomes. Each training instance pairs content features with a record of user interactions to enable the model to learn which linguistic or visual elements are most correlated with favorable engagement. The content personalization model 328 outputs a ranked set of message variants or generates new text through a natural language generation algorithm. During operation, the model receives predictive scores from the predictive analytics and detection model 318 and selects or constructs content that aligns with the predicted engagement probability, while ensuring compliance constraints communicated through the user interface 302 are observed.

The privacy and compliance model 312 may incorporate rule-based logic augmented by machine-learning classifiers, such as logistic regression models or transformer encoders trained to identify personally identifiable information within incoming data streams. Training data for this model may include labeled datasets representing compliant and non-compliant data records under privacy frameworks such as the General Data Protection Regulation (GDPR) or the California Consumer Privacy Act (CCPA). The privacy and compliance model 312 assigns classification confidence values to indicate whether consent metadata is valid or expired. During runtime, it monitors user data and outbound message payloads, automatically flagging or sanitizing any fields that violate established compliance rules. For instance, when the model detects a record containing an email address without valid consent metadata, it generates an alert transmitted to the automated compliance action 310, which executes a corrective process such as redaction or record suppression.

Additional adaptive models may be incorporated through the modular AI model integration interface 342, including clustering models for audience segmentation or reinforcement learning agents for adaptive budget allocation. Each model introduced through the integration interface is registered with metadata defining its input schema, output structure, and retraining frequency, which are stored in the model version control and change management 336 repository. Training for such models may occur periodically on historical datasets or continuously via the system feedback loop 338, which provides updated training examples derived from live user interactions and engagement metrics. The system feedback loop 338 thereby enables incremental retraining and adjustment of model parameters to reflect observed changes in user behavior, compliance regulations, or system performance conditions. Collectively, these implementations illustrate that the artificial intelligence models employed by the system 100 are trainable using standard datasets and algorithms, are interoperable through defined data interfaces, and are capable of performing the coordinated real-time prediction, personalization, and compliance verification required for automated operation.

Throughout execution, the user interface 302 updates in real time with metrics streamed from the real-time dataflow 324, including engagement rates, open times, and model confidence intervals. The operator can pause or resume campaign actions directly from the user interface 302, which transmits control signals through the API to the underlying models. The user interface 302 thereby enables both manual supervision and automated feedback-based adjustment, providing an accessible control layer that is technically integrated with every core function of the system 100. This configuration ensures that a person of ordinary skill in the art could implement or use the user interface 302 to manage adaptive AI-driven marketing and compliance operations without undue experimentation.

The system 100 further includes CRM integration 304, which provides data synchronization between external customer relationship management (CRM) platforms and the system 100. The CRM integration 304 receives structured customer data such as contact history, transaction logs, and engagement timestamps. The data is normalized and transmitted to a data processing module 306 that performs filtering, deduplication, and schema alignment. The processed data is stored within a database 308, which may be implemented as a distributed, fault-tolerant storage system supporting real-time read and write operations. The database 308 stores user profiles, campaign metadata, and performance logs, enabling retrieval by the predictive and personalization models.

Compliance verification within the system is implemented by an automated compliance action 310, a privacy and compliance model 312, a real-time regulatory compliance check 314, and a real-time privacy audit 316. The privacy and compliance model 312 applies trained AI classifiers to monitor consent status and data-handling operations against privacy regulations such as the General Data Protection Regulation (GDPR) and the California Consumer Privacy Act (CCPA). The automated compliance action 310 initiates system-level responses, such as pausing a data transfer or redacting personally identifiable information, when non-compliance is detected. The real-time regulatory compliance check 314 continuously compares data-processing operations with stored regulatory rule sets, while the real-time privacy audit 316 records access events and generates audit trails for administrative review. For example, if a marketing message targets a user in a jurisdiction with stricter consent rules, the compliance model 312 modifies or suppresses that message automatically.

The system 100 further includes a predictive analytics and detection model 318, which executes forecasting algorithms to estimate engagement probabilities based on historical interaction data, time-of-day metrics, and frequency of prior user actions. The predictive analytics and detection model 318 employs predictive analytics to anticipate user behavior trends, informing proactive engagement strategies that dynamically adjust to current and projected engagement patterns. This model facilitates forward-looking adjustments, maintaining optimal engagement as user behaviors evolve. The predictive analytics and detection model 318 provides output data representing expected engagement likelihoods, which are transmitted to the Content Personalization Model 328. The content personalization model 328 selects or generates message content using natural-language-generation techniques or recommendation algorithms that reference the predictive output. For example, if the predictive model forecasts a higher probability of response to visual media, the personalization model 328 selects a format emphasizing image content rather than text. Both models are coordinated such that updates in predictive outcomes cause corresponding changes in content selection parameters in real time.

Computational efficiency is maintained by a dynamic load balancing and resource allocation 320 subsystem. The dynamic load-balancing component monitors processing loads across active AI models and reallocates computing resources when thresholds are exceeded. For instance, during a high-traffic period, additional processor threads may be assigned to the predictive analytics and detection model 318, while lower-priority background tasks are deferred. The performance monitoring module 322 measures throughput, latency, and error rates associated with each AI model. If degradation in model accuracy or latency is detected, the performance monitoring module 322 triggers an adaptive retraining sequence or resource redistribution via the load-balancing component.

Inter-module communication occurs through real-time dataflow 324, which establishes a continuous stream of structured data between the various modules. The dataflow 324 ensures that outputs of one module become available as inputs to another with minimal delay. Engagement data collected through active campaigns or external systems are transmitted via this channel. User interaction metrics are captured through User Feedback 326, which records events such as link clicks, form submissions, or session durations. This data is reintroduced into the predictive analytics model 318 and the content personalization model 328 to refine their parameters using online learning techniques. For example, a decrease in click-through rate may cause an automatic adjustment of content weighting factors in the personalization model.

The distribution channels 334 represent communication endpoints through which generated content is delivered. These include Email, SMS, social media, Website Updates 330, which are executed through corresponding APIs or integration adapters. Operational performance of these channels is analyzed by the Usage Analytics 332 module, which computes conversion rates, dwell times, and bounce statistics. The resulting analytics are stored in the database 308 and used as feedback for subsequent model retraining. For example, if the usage analytics 332 detect that social-media posts generate higher conversion than SMS campaigns for a particular demographic, the predictive analytics model 318 adjusts its weighting to favor social-media channel allocation.

The system 100 enables cross-channel synchronization and emotional engagement. For example, cross-channel synchronization is enabled by synchronizing engagement strategies across platforms (e.g., email, SMS, social media) to maintain a cohesive user experience. This ensures consistent interactions, leveraging real-time adaptability to regulatory needs and user feedback. In another example, to enable emotion-driven interaction adjustments the system 100 analyzes emotional data in real-time to align personalized content with user sentiment, reinforcing engagement and customer loyalty through highly tailored interactions. In another example, to enable adaptive collaboration for emotional engagement the system 100 coordinates among models to adjust engagement prompts, tone, and intensity according to users'emotional readiness, improving conversion rates by enhancing the emotional resonance of interactions. In another example, to enable real-time budget reallocation the system 100 dynamically reallocates resources to prioritize high-engagement channels based on real-time engagement metrics, ensuring cost-effectiveness and maximizing reach across new and existing channels.

The system 100 implements an emotionally responsive user engagement architecture that dynamically adapts interaction parameters based on real-time emotional and contextual input data. The system 100 includes an emotion-driven workflow trigger module configured to receive and process live emotional state data from user interactions. Based on the detected emotional parameters, the module initiates predefined workflows that adjust engagement strategies, communication methods, and system responses. This functionality enables the system 100 to modify its operational behavior in response to variations in user sentiment or engagement level, thereby improving interaction relevance and continuity.

The system 100 further includes a unified cross-channel synchronization module designed to maintain consistent user engagement across multiple communication platforms. This module aggregates and normalizes engagement data from disparate sources, ensuring synchronized content delivery and message alignment. By integrating engagement data into a unified framework, the system 100 provides cross-platform consistency, allowing for real-time updates and uniform behavioral responses regardless of the user's point of access. This ensures that user experience remains contextually coherent and technically synchronized across all interaction channels.

A context-sensitive adaptive collaboration component within the system 100 coordinates engagement elements such as message tone, timing, and interaction prompts according to the user's current position in the interaction sequence. This component utilizes contextual and emotional data to determine appropriate communication parameters, modifying system responses in real time. The adaptive collaboration feature optimizes engagement flow and minimizes interaction drop-off by aligning system behavior with the user's cognitive and emotional readiness.

The system 100 also incorporates a layered personalization framework that integrates real-time emotional analytics, behavioral metrics, and psychological modeling to refine user-specific engagement parameters. This framework continuously adjusts the content, intensity, and structure of interactions based on evolving user data profiles. By combining emotional and behavioral feedback mechanisms, the system 100 achieves dynamic, data-driven personalization that optimizes system performance for individual user states and long-term engagement stability.

The system 100 employs an adaptive system architecture designed to support scalability, modularity, and continuous evolution across diverse operational contexts. The system 100 utilizes a modular architecture for flexible integration, enabling the addition or removal of AI models based on specific functional or regulatory requirements. This modular design allows seamless incorporation of emerging technologies and facilitates configuration for varied applications such as personalized engagement, compliance monitoring, and dynamic workflow management. The modular framework ensures compatibility across heterogeneous system environments while maintaining operational stability. The system 100 further includes an adaptable AI model integration layer configured to support selective deployment of AI components. This layer enables dynamic selection and execution of AI models optimized for specific engagement objectives or regulatory domains. Through this flexible integration mechanism, the system 100 maintains performance and compliance across multiple use cases, ensuring that AI-driven processes remain contextually appropriate and technically efficient.

The system 100 supports continuous system evolution through an architecture that allows incremental updates, modular scalability, and integration of new AI methodologies and compliance standards. This component is designed to incorporate user feedback and real-time operational data into the development cycle, facilitating adaptive upgrades without service disruption. The continuous evolution capability ensures that the system 100 remains aligned with technological advancements and evolving regulatory frameworks. Additionally, the system 100 implements predictive and adaptive scaling mechanisms that utilize machine learning algorithms to forecast system load and allocate computational resources accordingly. These predictive algorithms analyze traffic patterns, anticipated high-demand events, and user engagement trends to dynamically adjust processing capacity. By proactively managing resource distribution, the system 100 maintains optimal responsiveness, system stability, and engagement quality during fluctuating operational conditions.

Adaptability and scalability are achieved through modular AI model integration 342 and model version control and change management 336. The modular AI model integration 342 provides a registration interface that allows new AI models to be added without altering the system architecture. Each added model is registered with metadata including input format, output schema, and performance indicators. The model version control and change management 336 component maintains a record of all deployed model versions and supports rollback to a prior version when performance degradation is detected. This ensures traceability and reproducibility for compliance audits. For example, if a new personalization model reduces overall engagement, the system reverts to the previous model version until retraining is complete.

The system 100 implements an automated campaign optimization framework (feedback loop 338) designed to enhance engagement efficiency, targeting accuracy, and adaptive decision-making through data-driven automation. The system 100 includes a performance tracking and feedback module that employs multi-touch attribution and A/B testing methodologies to collect detailed engagement metrics across multiple channels. These metrics are processed to generate performance feedback loops that iteratively refine personalization models and content delivery parameters. Through continuous performance analysis, the system 100 enhances content relevance, targeting precision, and overall campaign effectiveness. The system 100 further includes a retargeting campaign and adaptive budget reallocation component configured to initiate follow-up campaigns based on specific user behaviors, such as cart abandonment or incomplete interactions. This component dynamically reallocates financial and computational resources toward channels exhibiting higher engagement rates. By prioritizing high-response platforms and optimizing expenditure distribution, the system 100 maximizes campaign impact while maintaining cost efficiency. An automated performance adjustment module within the system 100 monitors real-time engagement and interaction metrics to modify targeting parameters, audience segmentation, and budget allocations dynamically. This module continuously analyzes incoming data streams and applies optimization algorithms to ensure resources are directed toward the most effective communication channels. The automated adjustment process maintains campaign responsiveness and ensures optimal engagement performance across variable operational conditions. Additionally, the system 100 incorporates a looped insights and A/B testing mechanism designed to enable iterative improvement of campaign strategies. This mechanism executes repeated test cycles to evaluate variations in segmentation, content delivery, and personalization strategies. Data derived from user interaction patterns and behavioral responses are fed back into the optimization model, allowing the system 100 to evolve its campaign logic over time. This closed-loop feedback structure ensures that subsequent campaigns leverage empirical performance data to achieve progressively higher levels of precision and engagement efficiency.

The feedback loop 338 governs adaptive improvement across all AI models by linking performance data from the usage analytics 332 and user feedback 326 with model retraining workflows. This feedback loop ensures that each AI component continuously adjusts its parameters to reflect the latest operational data. For instance, results from A/B testing are supplied to the predictive analytics model 318 to recalibrate probability thresholds. The feedback loop 338 also coordinates synchronization among models to maintain consistency between predicted engagement, content generation, and compliance outcomes.

Data integrity and operational continuity are maintained by Automated Backup Schedules 340. The automated backup schedules 340 execute periodic and event-triggered data replication routines that store copies of the database 308 and model parameters across geographically distributed storage locations. In one embodiment, incremental backups are performed every hour for active campaign data, while full system backups occur daily. If a failure is detected in one data center, the system automatically restores from the most recent valid backup to a secondary location. These backup operations ensure minimal data loss and enable recovery from hardware or network faults without human intervention.

In certain embodiments, the system 100 is configured to integrate additional artificial intelligence models, responsive to changes in the plurality of data sources or to modifications of one or more marketing parameters, through the modular AI model integration 342 interface. The integration interface includes an application programming interface (API) and a registration protocol that allows new models to be introduced without requiring modification to the underlying system architecture. When an additional model is introduced, the modular AI model integration 342 records metadata describing the model, including its model type, version number, input and output schema definitions, training frequency, and dependency requirements. This metadata is stored in the model version control and change management 336 repository, which maintains version lineage and dependency mapping among all models operating within the system 100. Once registered, the integration interface automatically synchronizes the new model with existing data pipelines defined within the real-time dataflow 324 by mapping the model's declared input features to available data fields and aligning its output to the receiving modules' expected data structures. Synchronization occurs through an adapter layer that converts differing data formats into standardized intermediate representations, ensuring compatibility and preventing disruption to ongoing operations.

For example, if a new sentiment analysis model is introduced to enhance content selection based on emotional tone detected in social media responses, the operator initiates the registration process through the user interface 302. The modular AI model integration 342 receives the model's metadata, which specifies input features including message text and user reaction data retrieved through CRM integration 304 and the data processing module 306. The integration interface aligns these inputs with existing fields in the database 308 and establishes an output link to the content personalization model 328. Once synchronization is complete, the sentiment model's outputs—numerical sentiment scores ranging from negative to positive polarity—are transmitted in real time to the content personalization model 328 through the real-time dataflow 324. The personalization model uses these scores to adjust message tone or imagery selection dynamically. For instance, if the sentiment model identifies negative user reactions to a product image, the personalization model automatically selects alternative content with neutral or positive sentiment alignment. Throughout this process, the system architecture remains unchanged;

only the metadata registry and pipeline mappings are updated. The model version control and change management 336 repository logs the integration event, enabling rollback or retraining if the new model underperforms. This configuration ensures that the system 100 can expand its functional scope by incorporating new artificial intelligence models while preserving architectural stability and operational continuity.

Collectively, the modules illustrated in FIGS. 3 to 5 enable a system that performs the claimed operations of real-time marketing automation using adaptive AI models. Each functional component is described with sufficient structure to allow implementation by one of ordinary skill in the art. The combination of the user interface 302, the predictive analytics and detection model 318, the content personalization model 328, and the compliance modules 310-316 provides coordinated and explainable operation. The system 100 is fully enabled by the disclosed architecture, which supports end-to-end data processing, adaptive AI coordination, compliance verification, feedback-driven optimization, and automated recovery mechanisms.

In one illustrative example of operation, a retail organization deploys the system 100 to manage real-time promotional messaging for a new product launch. A marketing operator accesses the user interface 302 to define campaign parameters that include target demographics, engagement timing, and compliance requirements. Through CRM integration 304, the system retrieves recent purchase histories and engagement records from an external customer relationship management platform. These records are transferred to the data processing module 306, which removes duplicate entries and aligns the data schema for storage in the database 308. The predictive analytics and detection model 318 accesses this processed data and applies time-series forecasting algorithms to estimate a likelihood of user engagement for each identified customer profile. The model identifies, for example, that users in a specific age range who purchased a related product within the last thirty days have a forty-percent higher probability of responding to follow-up offers. This probability value is transmitted through the real-time dataflow 324 to the content personalization model 328, which generates individualized message templates. For users with higher engagement likelihood, the personalization model selects a detailed product recommendation containing visual elements, while for users with lower engagement likelihood, the system generates shorter text-based notifications to reduce processing cost and delivery time.

Before the generated messages are transmitted to the distribution channels 334, the privacy and compliance model 312 and real-time regulatory compliance check 314 verify that each user record contains a valid consent flag in accordance with applicable regulations such as the GDPR or CCPA. If a record lacks verified consent, the automated compliance action 310 removes identifying fields and replaces the corresponding message content with a general promotional notice that contains no personal data. After validation, the personalized content is distributed through email, SMS, social media, website updates 330. The usage analytics 332 component collects delivery confirmations, open rates, and link-click metrics in real time and transmits those results back into the system feedback loop 338. When the analytics data indicate that messages sent in the evening generate twenty-percent higher engagement than those sent in the morning, the predictive analytics model 318 automatically updates its temporal weighting parameters to favor later distribution times. Concurrently, the dynamic load balancing and resource allocation 320 subsystem increases processor allocation to the content personalization model to accommodate higher message volume. The automated backup schedules 340 perform incremental backups of updated user profiles and campaign statistics to a secondary data center, ensuring recovery capability if a network fault occurs. This illustrative sequence demonstrates a fully enabled example of how the system 100 operates to coordinate adaptive AI models, maintain compliance, dynamically allocate resources, and continuously refine performance through iterative feedback.

Figure 6:
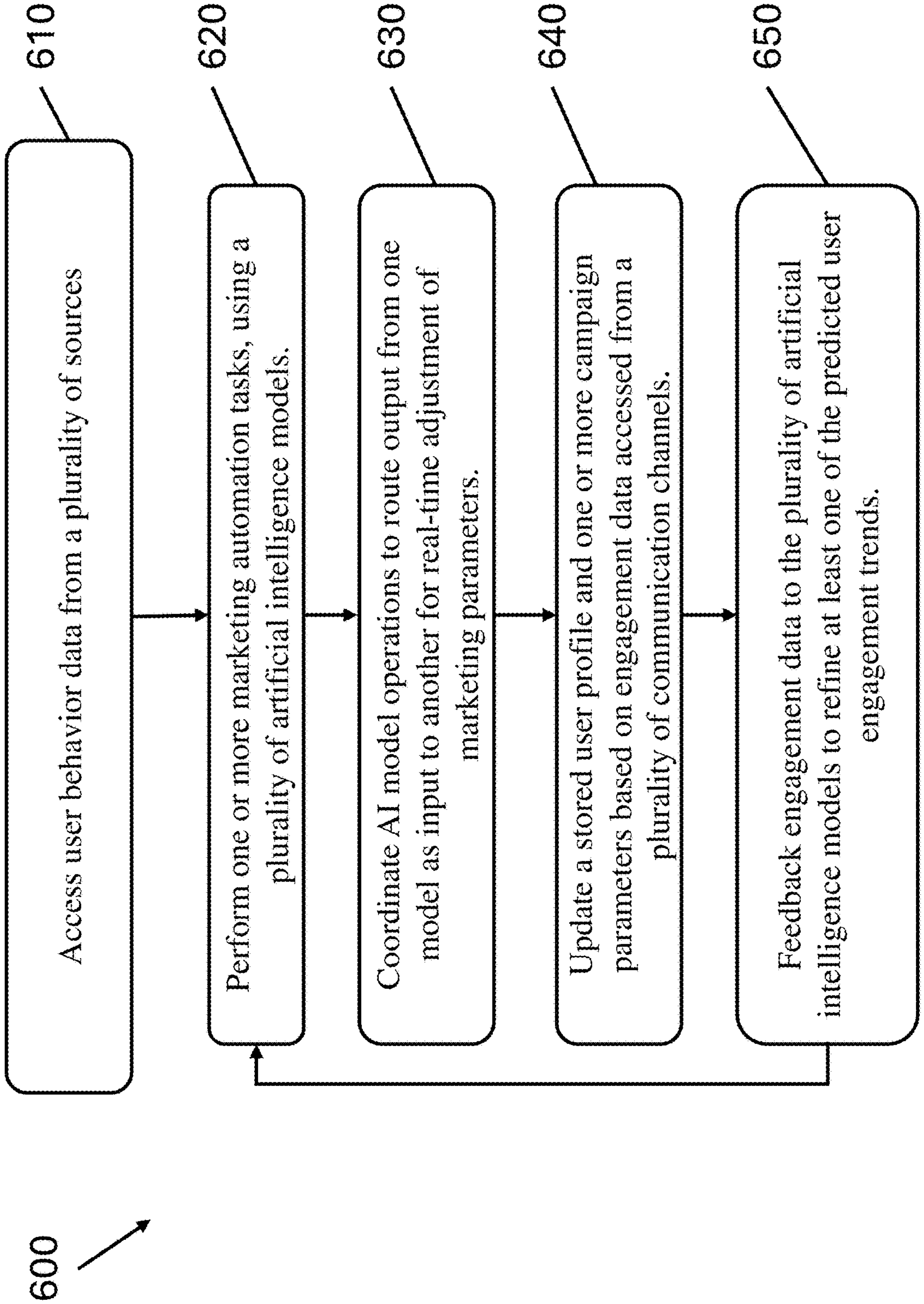
FIG. 6 is a flow chart for a method for a system for real-time marketing automation using adaptive artificial intelligence, according to aspects of the present disclosure.

With reference to FIG. 6 a flowchart 600 illustrating an example method for real-time marketing automation using adaptive artificial intelligence (AI) models using system 100 of FIG. 1 is shown. The method 600 may be performed by the processor 200 of FIG. 2. Portions of the method 600 may be performed by a separate device, such as a server. Although the steps are shown in a particular sequence, the operations may occur concurrently, iteratively, or in a different order depending on data availability, system configuration, or processing load.

At step 610, the system 100 accesses user-behavior data from a plurality of sources including at least two of customer relationship management (CRM) systems, social-media platforms, websites, or mobile applications. The system 100 may obtain this data in real time through streaming APIs or in batches through scheduled ingestion processes. The user-behavior data can include transaction records, browsing histories, message opens, and clickstream activity. The system 100 may further access data from analytics tools, customer-data platforms, or third-party engagement services. In aspects, the system 100 normalizes, cleanses, and aggregates the incoming data by mapping identifiers across systems, synchronizing timestamps, removing duplicate entries, and anonymizing personal identifiers. This produces a standardized data layer that supports consistent downstream processing.

At step 620, the system 100 performs one or more marketing-automation tasks using a plurality of artificial-intelligence models. Each model produces output data that includes at least one of predicted user-engagement trends, personalized content, or compliance-monitoring results. The system 100 may include a predictive-analytics model that forecasts user engagement likelihood based on recent behavioral features, a content-personalization model that generates or selects marketing messages tailored to the user, and a compliance-monitoring model that validates data handling against active consent records and applicable privacy regulations such as GDPR or CCPA. The models may be implemented as containerized services executing in parallel. In an example, the system forecasts engagement likelihood by applying temporal-trend analysis and weighting recent user interactions to estimate future responsiveness.

At step 630, the system 100 coordinates operation of the plurality of artificial-intelligence models such that the output data from one model is used as input to another to adjust one or more marketing parameters in real time. In aspects, the system 100 may handle this coordination by defining dependency rules between models and routes output data accordingly. For example, an engagement score generated by the predictive-analytics model may be provided as input to the content-personalization model to determine message timing, channel selection, or creative variation. The compliance-monitoring model may operate concurrently, validating that the personalization process complies with user consent and regulatory standards. The system 100 thus maintains synchronized collaboration between models, ensuring that predictive, personalization, and compliance functions continuously inform one another.

At step 640, the system 100 updates stored user profiles and one or more campaign parameters based on engagement data accessed from a plurality of communication channels. The engagement data may include user responses such as advertisement clicks, email opens, voice-assistant queries, or in-application events. The engagement data is fed back to the plurality of artificial-intelligence models to refine their outputs, improving predictive accuracy, personalization quality, and compliance verification over time. In aspects the system 100 may apply A/B testing results, conversion metrics, and detected engagement anomalies to retrain or recalibrate one or more of the artificial-intelligence models. As an illustrative example, if users frequently engage with social-media advertisements but rarely with email content, the system 100 updates campaign parameters to increase budget allocation to social-media channels and adjusts user-profile attributes to reflect channel preference. The feedback process may employ reinforcement learning or other adaptive algorithms to continually improve the system's decision quality.

At step 650, the system 100 feeds back engagement data to the plurality of artificial intelligence models to refine at least one of the predicted user engagement trends. The system 100 may use the feedback engagement data to adjust the output of one or more of the plurality of artificial intelligence models to train the networks further or to perform one or more marketing automation tasks, such as dynamically adjusting campaign parameters, reallocating channel resources, or refining audience segmentation in real time based on the CNN-derived predictions.

The system 100 provides advanced audience segmentation and engagement. The system 100 utilizes adaptive clustering to segment users based on real-time behavioral data. This feature supports targeted campaigns that adjust dynamically across channels, enhancing personalization and engagement by anticipating user trends. The system 100 may provide dynamic content personalization by adjusting content delivery based on user interactions, allowing personalized messages to be tailored to each user across various channels. This dynamic adaptability ensures relevance as the system integrates with new channels and devices. The system 100 may provide emotional and psychological segmentation by incorporating emotional and psychological insights into audience segmentation, enabling highly personalized engagement strategies that adapt based on user sentiment and motivational cues. The system 100 uses predictive analytics to forecast user behavior trends, supporting proactive engagement strategies that adjust in real time as user preferences evolve.

The system 100 may integrate additional artificial-intelligence models through user interface 302 (FIG. 3) configured to register metadata describing each model and to synchronize the additional models with existing data pipelines without altering the underlying system architecture. The user interface 302 may receive metadata describing a model's functional type, input schema, output schema, and performance requirements. Upon registration, the system 100 may automatically connect the new model to compatible data flows and updates the dependency graph to include the additional model. This integration may occur dynamically at runtime without recompiling or modifying the existing software architecture. In aspects, the system 100 may registers a new model by submitting its metadata to the interface and synchronizing its input and output formats with the existing models. For example, when the system 100 detects that sentiment data from a voice-assistant platform has become available, it may integrate a sentiment-analysis model that enhances personalization decisions by adjusting tone or message type based on real-time emotional analysis.

Throughout the method 600, the system 100 may reallocate computational resources among the plurality of artificial-intelligence models in response to detected workload variations or campaign performance thresholds. The system 100 may monitor latency and throughput metrics, distributing workloads to maintain consistent performance during peak engagement periods. In aspects, the system 100 may generate explainability data describing the decision paths, parameter weightings, and feature contributions used by one or more models. The explainability data provides transparency for auditing and compliance and is stored in a governance log accessible through an administrative interface.

In aspects, the system 100 may include bias-detection routines and ethical-governance features that evaluate fairness of model outputs across demographic segments. When a bias metric exceeds a defined threshold, the system 100 can trigger automatic retraining or rebalancing of datasets. Consent management may be integrated so that changes in user preferences are propagated across all AI models and marketing channels in real time. The system 100 may further ensure security and privacy by encrypting user data both in transit and at rest, and by maintaining audit trails for all data-access operations.

The system 100 provides data collection and insights layering. The system 100 continuously gathers behavioral data to update user profiles dynamically, segmenting users based on real-time engagement insights. This capability supports precise targeting by ensuring that each segment reflects up-to-date user behavior and preferences. The system 100 provides behavioral insights layering for enhanced analysis by adding an analytical layer capturing both emotional and behavioral insights, which remains adaptable to future metrics and analytical tools. This layered analysis provides an enriched understanding of user interactions, supporting nuanced engagement strategies. The system 100 provides user feedback integration for adaptive model refinement by employing continuous A/B testing and real-time user feedback to iteratively refine AI models. This feedback loop enhances personalization strategies based on actual engagement, ensuring sustained relevance without reliance on proprietary configurations.

Scalability and fault-tolerance features may be built into the orchestration framework. The system 100 may automatically scale computing resources based on predicted engagement volume and maintain redundant data replicas in geographically distributed storage. If a node fails, the system initiates failover to a secondary node without interrupting marketing operations. These mechanisms ensure high availability for large-scale deployments across industries such as retail, healthcare, or finance.

The system 100 may also interact with third-party platforms to exchange data and extend functionality. In aspects, the system 100 may interface with external CRM systems to synchronize lead-scoring data, with analytics platforms to capture multi-touch attribution metrics, and with customer-data platforms to unify customer identifiers. Integration with workflow-automation tools enables cross-platform campaign triggers initiated by outputs of the AI models.

For example, when a user browses a product page through a mobile application, the system collects that activity at step 610 and merges it with purchase data from the CRM and advertisement engagement from social media. At step 620, the predictive model determines a probability that the user will buy within the next 24 hours, and the personalization model generates a discount offer. At step 630, these models coordinate so that the compliance model validates consent status before delivery. At step 640, if the user views the offer but does not purchase, that engagement feedback adjusts the predictive weighting and updates the campaign parameter for timing of follow-up offers. At step 650, the system integrates a new reinforcement-learning model that dynamically adjusts message sequencing based on subsequent user behavior, all without modifying the underlying system architecture. This example illustrates how the system continuously refines its predictions, content, and regulatory compliance through coordinated AI collaboration and feedback-driven adaptation.

Through the operations of method 600 and the optional aspects described the system 100 performs real-time marketing automation across a plurality of digital channels while maintaining adaptability, compliance, transparency, and architectural stability.

The disclosed system provides a concrete technological improvement in the field of automated digital communications and data-driven marketing through coordinated, machine-executed processing of multi-source behavioral data using adaptive artificial intelligence models. The claimed features are implemented by a processor and memory that perform defined data-processing operations in real time to manage computational workloads, synchronize model outputs, and dynamically adjust operational parameters without human intervention. The coordinated interaction among the predictive analytics model, content personalization model, and compliance monitoring model yields improved computer functionality by reducing latency in data processing, minimizing redundant computation across models, and preventing propagation of inconsistent or noncompliant data. The integration interface for additional artificial intelligence models constitutes a specific technical mechanism that enables modular model registration, metadata synchronization, and data pipeline alignment without requiring reconfiguration of the system architecture, thereby improving scalability and system uptime compared to conventional marketing software. The adaptive feedback process transforms engagement metrics and user interaction data into machine-readable inputs for automatic model retraining, enhancing predictive accuracy and personalization efficiency over time. These coordinated operations are not merely organizational or administrative in nature but instead improve the operation of computer systems executing real-time data processing tasks by optimizing resource allocation, enabling dynamic load balancing, and ensuring regulatory compliance at the system level. As such, the claimed invention provides a practical application of artificial intelligence and machine learning technologies to achieve specific, technical improvements in data synchronization, system adaptability, and computational performance in distributed, real-time environments.

Figure 7:
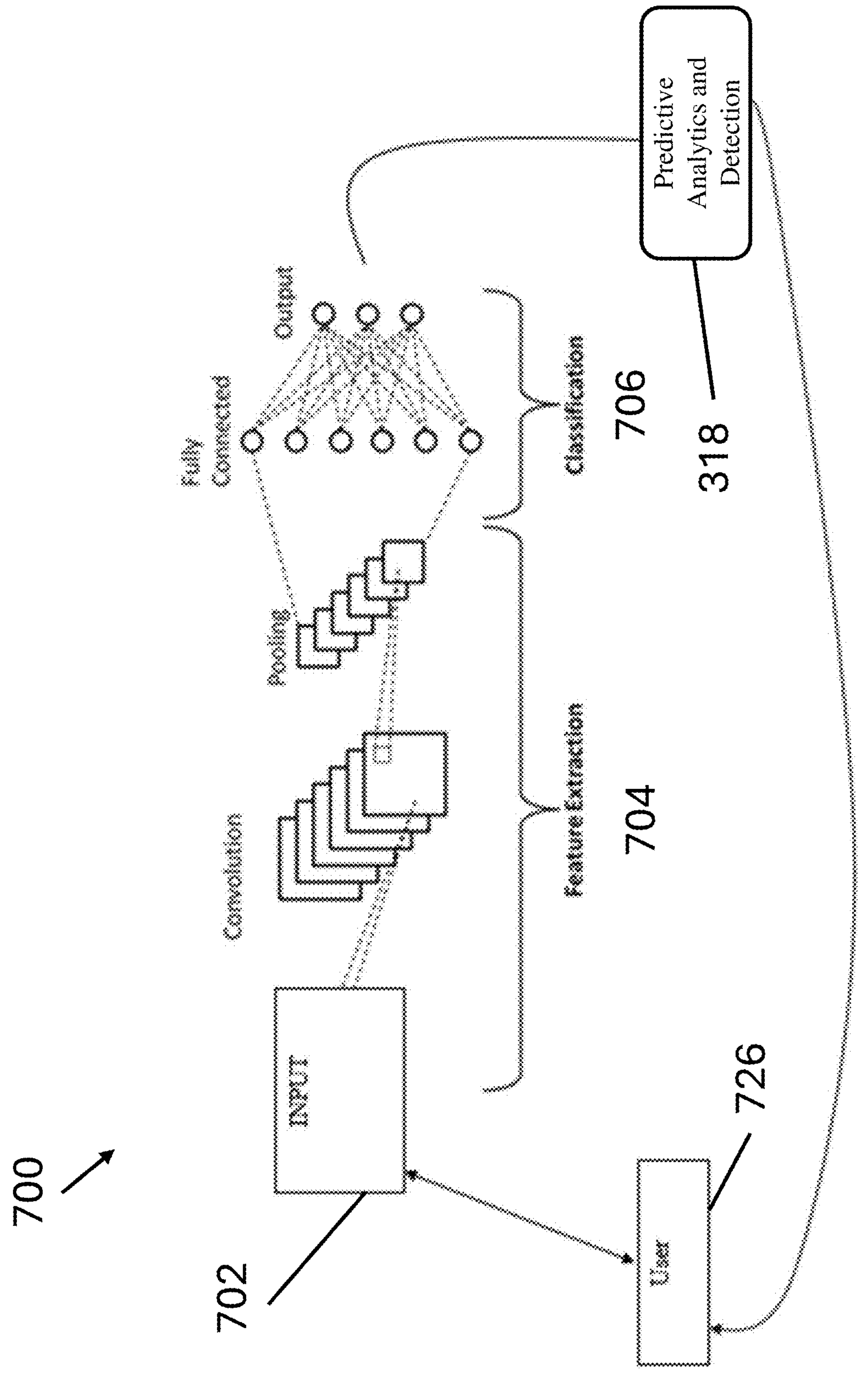
FIG. 7 is a schematic illustration of a convolutional neural network employable by the system of FIG. 1, according to aspects of the present disclosure.

FIG. 7 is a schematic illustration of a convolutional neural network (CNN) employable by the machine learning model 700 of FIG. 1 according to aspects of the present disclosure.

In CNNs, feature extraction 704 is the process of automatically identifying relevant patterns or features from input data, which may include text, images, or structured behavioral data. The feature extraction 704 function is performed through convolutional layers composed of filters or kernels that systematically traverse the input data, performing mathematical operations that generate feature maps highlighting distinct data characteristics. For example, in image-based data these filters may detect shapes or textures, while in textual or behavioral datasets they may identify recurring engagement sequences or keyword groupings. Through iterative training, the CNN 700 adjusts the weights of these filters to extract features that most effectively represent predictive attributes relevant to downstream processing modules within the system 100.

Following feature extraction, pooling 706 is performed as a down-sampling operation to reduce the dimensionality of the generated feature maps. The pooling 706 operation summarizes information within local neighborhoods of the feature maps, preserving essential data characteristics while improving computational efficiency. A commonly used pooling method is max pooling, which retains the highest activation value within each defined region. This process enhances the model's robustness to minor variations in input data, such as small behavioral fluctuations or time-dependent noise, thereby preventing overfitting and improving generalization. Repeated application of feature extraction 704 and pooling 706 layers enables the CNN 700 to form a hierarchical internal representation of the data, learning abstract features that correspond to complex behavioral or semantic patterns across the integrated data sources.

After the pooling operation, the transformed data is passed into one or more fully connected layers functioning as classifiers 708. The classifiers 708 interpret the high-level features produced by prior layers and map them to one or more predictive categories or probability distributions. During training, parameters associated with the classifiers 708 are optimized using backpropagation and gradient descent to minimize the loss between predicted values and known training targets. In some embodiments, the final layer of the CNN 700 applies a SoftMax activation function to normalize output values into a probability vector that corresponds to specific engagement outcomes or user response likelihoods.

For example, when the CNN 700 processes user interaction data obtained through the CRM integration 304 and data processing module 306, it may generate output values indicating the probability that a user will respond to a particular content type or channel. These probability values are transmitted to the predictive analytics and detection model 318, which interprets them as engagement likelihood scores. The predictive analytics and detection model 318 then uses this output to perform one or more marketing automation tasks, such as dynamically adjusting campaign parameters, reallocating channel resources, or refining audience segmentation in real time based on the CNN-derived predictions.

The devices, systems, and methods described herein may each employ a distributed processing architecture, as desired.

A system for distributed processing of multi-channel marketing data include a processor and a memory including instructions stored thereon, which, when executed by the processor, cause the system to coordinate operation of a number of processing stages through defined modification protocols between stages. The memory includes instructions stored thereon, which, when executed by the processor, cause the system to operate each processing stage in deterministic or AI-enhanced mode based on configuration parameters, preserve prior transformation states while applying additive modifications within designated functional domains, and output transformed marketing content maintaining compatibility with multiple distribution channels.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for real-time marketing automation using adaptive artificial intelligence (AI) models, comprising:
 a processor; and
 a memory including instructions stored thereon, which, when executed by the processor, cause the system to:
  access user behavior data from a plurality of sources including at least two of: customer relationship management systems, social media platforms, websites, or mobile applications, wherein the plurality of sources provide the user behavior data in differing data formats;
  perform one or more marketing automation tasks, using a plurality of artificial intelligence models including at least one of a transformer-based neural network, a recurrent neural network, a convolutional neural network, a neural language model, or a gradient-boosted decision tree ensemble, the one or more marketing automation tasks include as output data one or more of: predicting user engagement trends, generating personalized content, or monitoring compliance with data privacy requirements;
  coordinate operation of the plurality of artificial intelligence models such that the output data from one of the plurality of artificial intelligence models is used as input to another one of the plurality of artificial intelligence models to adjust one or more marketing parameters in real time;
  update a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and
  integrate additional artificial intelligence models, responsive to changes in the plurality of sources or the one or more marketing parameters, through an interface configured to, for each additional artificial intelligence model:
  register metadata describing the additional artificial intelligence model in a model registry, the metadata including input schema definitions and output schema definitions of the additional artificial intelligence model;
  automatically synchronize the additional artificial intelligence model with existing data pipelines carrying data derived from the plurality of sources, by mapping declared input features of the additional artificial intelligence model to available data fields and aligning outputs of the additional artificial intelligence model to expected data structures of one or more receiving modules, wherein synchronization of the additional artificial intelligence model occurs through an adapter layer that converts differing data formats into standardized intermediate representations; and
  transmit, upon completion of the synchronization, the outputs of the additional artificial intelligence model in real time through a real-time dataflow to the one or more receiving modules for use as inputs thereto, without altering an underlying system architecture of the system.

2. The system of claim 1, wherein the plurality of artificial intelligence models includes a predictive analytics model configured to forecast user engagement likelihood based on temporal activity patterns and interaction frequency metrics.

3. The system of claim 1, wherein the plurality of artificial intelligence models includes a content personalization model configured to select or generate marketing content using natural language generation or recommendation algorithms.

4. The system of claim 1, wherein the plurality of artificial intelligence models includes a compliance monitoring model configured to verify user consent status and data-handling operations in accordance with privacy regulations including a General Data Protection Regulation (GDPR) and a California Consumer Privacy Act (CCPA).

5. The system of claim 1, wherein coordinating operation of the plurality of artificial intelligence models includes generating a shared context dataset that aligns outputs of a predictive analytics model, a content personalization model, and a compliance monitoring model.

6. The system of claim 1, wherein a defined feedback process includes updating one or more parameters of at least one of the plurality of artificial intelligence models based on A/B testing results, conversion metrics, or detected engagement anomalies.

7. The system of claim 1, wherein the interface for integrating the additional artificial intelligence models includes an application programming interface configured to register metadata of each additional artificial intelligence model and synchronize input and output formats of each additional artificial intelligence model.

8. The system of claim 1, wherein the instructions when executed by the processor, further cause the system to dynamically reallocate computing resources among the plurality of artificial intelligence models based on detected processing loads or campaign performance thresholds.

9. The system of claim 1, wherein the instructions when executed by the processor, further cause the system to store version control data for each of the plurality of artificial intelligence models, and the processor reverts to a prior version of one of the plurality of artificial intelligence models upon detecting degraded performance.

10. The system of claim 1, wherein the instructions when executed by the processor, further cause the system to generate explainability data describing decision paths or parameter weightings associated with a predictive analytics model to support auditability and transparency.

11. A computer-implemented method for real-time marketing automation using adaptive artificial intelligence (AI) models, comprising:
 accessing user behavior data from a plurality of sources including at least two of: customer relationship management systems, social media platforms, websites, or mobile applications, wherein the plurality of sources provide the user behavior data in differing data formats;
 performing one or more marketing automation tasks, using a plurality of artificial intelligence models including at least one of a transformer-based neural network, a recurrent neural network, a convolutional neural network, a neural language model, or a gradient-boosted decision tree ensemble, the one or more marketing automation tasks include as output data one or more of: predicting user engagement trends, generating personalized content, or monitoring compliance with data privacy requirements;

coordinating operation of the plurality of artificial intelligence models such that the output data from one of the plurality of artificial intelligence models is used as input to another one of the plurality of artificial intelligence models to adjust one or more marketing parameters in real time;

updating a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and integrating additional artificial intelligence models, responsive to changes in the plurality of sources or the one or more marketing parameters, through an interface configured to, for each additional artificial intelligence model:

register metadata describing the additional artificial intelligence model in a model registry, the metadata including input schema definitions and output schema definitions of the additional artificial intelligence model;

automatically synchronize the additional artificial intelligence model with existing data pipelines carrying data derived from the plurality of sources, by mapping declared input features of the additional artificial intelligence model to available data fields and aligning outputs of the additional artificial intelligence model to expected data structures of one or more receiving modules, wherein synchronization of the additional artificial intelligence model occurs through an adapter layer that converts differing data formats into standardized intermediate representations; and transmit, upon completion of the synchronization, the outputs of the additional artificial intelligence model in real time through a real-time dataflow to the one or more receiving modules for use as inputs thereto, without altering an underlying system architecture.

12. The method of claim 11, further comprising forecasting user engagement likelihood based on temporal activity patterns and interaction frequency metrics using a predictive analytics model of the plurality of artificial intelligence models.

13. The method of claim 11, further comprising generating marketing content using a content personalization model of the plurality of artificial intelligence models based on user behavior data.

14. The method of claim 11, further comprising verifying user consent status and data-handling operations using a compliance monitoring model of the plurality of artificial intelligence models in accordance with privacy regulations.

15. The method of claim 11, further comprising generating a shared context dataset to align outputs of a predictive analytics model, a content personalization model, and a compliance monitoring model of the plurality of artificial intelligence models.

16. The method of claim 11, further comprising updating one or more parameters of at least one of the plurality of artificial intelligence models based on A/B testing results, conversion metrics, or detected engagement anomalies.

17. The method of claim 11, further comprising registering an additional artificial intelligence model through the interface by providing model metadata and synchronizing input and output formats of the additional artificial intelligence model with the plurality of artificial intelligence models.

18. The method of claim 11, further comprising reallocating computing resources among the plurality of artificial intelligence models based on detected processing loads or campaign performance thresholds.

19. The method of claim 11, further comprising generating explainability data describing decision paths or parameter weightings of at least one of the plurality of artificial intelligence models to support auditability and transparency.

20. A non-transitory computer readable medium, storing instructions for executing a computer-implemented method for real-time marketing automation using adaptive artificial intelligence (AI) models, comprising:

accessing user behavior data from a plurality of sources including at least two of: customer relationship management systems, social media platforms, websites, or mobile applications, wherein the plurality of sources provide the user behavior data in differing data formats;

performing one or more marketing automation tasks, using a plurality of artificial intelligence models including at least one of a transformer-based neural network, a recurrent neural network, a convolutional neural network, a neural language model, or a gradient-boosted decision tree ensemble, the one or more marketing automation tasks include as output data one or more of: predicting user engagement trends, generating personalized content, or monitoring compliance with data privacy requirements;

coordinating operation of the plurality of artificial intelligence models such that the output data from one of the plurality of artificial intelligence models is used as input to another one of the plurality of artificial intelligence models to adjust one or more marketing parameters in real time;

updating a stored user profile and one or more campaign parameters based on engagement data accessed from a plurality of communication channels, the engagement data being fed back to the plurality of artificial intelligence models to refine at least one of the predicted user engagement trends, the personalized content, or the compliance monitoring results; and integrating additional artificial intelligence models, responsive to changes in the plurality of sources or the one or more marketing parameters, through an interface configured to, for each additional artificial intelligence model:

register metadata describing the additional artificial intelligence model in a model registry, the metadata including input schema definitions and output schema definitions of the additional artificial intelligence model;

automatically synchronize the additional artificial intelligence model with existing data pipelines carrying data derived from the plurality of sources, by mapping declared input features of the additional artificial intelligence model to available data fields and aligning outputs of the additional artificial intelligence model to expected data structures of one or more receiving modules, wherein synchronization of the additional artificial intelligence model occurs through an adapter layer that converts differing data formats into standardized intermediate representations; and transmit, upon completion of the synchronization, the outputs of the additional artificial intelligence model in real time through a real-time dataflow to the one or more receiving modules for use as inputs thereto, without altering an underlying system architecture.

* * * * *